United States Patent [19]

Aprahamian

[11] Patent Number: 5,002,380
[45] Date of Patent: Mar. 26, 1991

[54] PHASE CORRECTOR FOR LARGE OPTICAL SYSTEMS

[75] Inventor: Robert Aprahamian, Hermosa Beach, Calif.

[73] Assignee: TRW Inc., Redondo Beach, Calif.

[21] Appl. No.: 324,502

[22] Filed: Mar. 16, 1989

[51] Int. Cl.$^5$ .............. G02B 17/06; G02B 23/06; G02B 26/08
[52] U.S. Cl. .................. 350/620; 350/505; 350/354; 350/321
[58] Field of Search ............ 350/321, 505, 504, 503, 350/354, 3.83, 620, 619

[56] References Cited

U.S. PATENT DOCUMENTS

| | | | |
|---|---|---|---|
| 4,284,324 | 8/1981 | Huignard et al. | 350/3.85 |
| 4,650,315 | 3/1987 | Markle | 350/505 |
| 4,674,824 | 6/1987 | Goodman et al. | 350/3.85 |
| 4,737,021 | 4/1988 | Kovsch | 350/505 |
| 4,927,251 | 5/1990 | Schoen | 350/620 |

OTHER PUBLICATIONS

David M. Pepper, "Applications of Optical Phase Conjugation", *Scientific American*, vol. 254, No. 1, Jan. 1986, pp. 74–83.

Vladimir V. Shkunov et al., "Optical Phase Conjugation", *Scientific American*, Dec. 1985, pp. 54–59.

M. D. Levenson, "High-Resolution Imaging by Wave-Front Conjugation", *Optics Letters*, vol. 5, No. 5, May 1980, pp. 182–184.

*Primary Examiner*—Jon W. Henry
*Attorney, Agent, or Firm*—Noel F. Heal; Sol L. Goldstein

[57] ABSTRACT

Apparatus and a corresponding method, for removing the effect of phase aberrations introduced into an incident light wave by a large optical element, such as a large concave mirror. Rather than building additional precision into the mirror, phase correction is effected by first collimating and phase conjugating the incident beam after reflection from the mirror, then expanding the beam again to fill the mirror. After its second reflection from the large mirror, the light beam is practically free of phase errors, since the phase conjugated beam is subject to substantially the same phase aberrating conditions as the incident beam. The apparatus may be used to produce an aberration-free image of a distant object, or to produce an aberration-free collimated light beam from a diffraction-limited laser source.

12 Claims, 2 Drawing Sheets

PHASE CORRECTOR FOR LARGE OPTICAL SYSTEMS

BACKGROUND OF THE INVENTION

This invention relates generally to imaging systems and, more specifically, to the correction of phase aberrations in imaging systems employing large optical elements. Differences in phase arise not only from differences in construction and geometrical relationships, but also from factors that may vary with time. In some imaging applications, such as those involving optical surveillance or the use of relay mirrors, there is a requirement to employ very large optical elements, usually mirrors. In many instances, these large optical elements need to be of very high quality, having an accuracy in the order one twentieth of a wavelength ($\lambda/20$). Light of wavelength 248 nm (nanometers), for example, requires tolerances of around $1.2 \times 10^{-6}$ cm to achieve phase coherence to within one twentieth of a wavelength. Typically, the technology simply does not exist to fabricate the optical elements to this high degree of accuracy. Often when the technology is available, the costs of manufacture are prohibitively high.

Accordingly, there is a critical need for a technique that employs optical elements of lower quality but still produces the desired phase quality.

One well known approach to the correction of phase aberrations is to employ principles of adaptive optics. Basically, this approach employs one or more deformable mirrors, which are large reflecting surfaces made up of separately movable elements, each driven by a transducer, such as a piezoelectric device. The character of the optical wavefront emanating from such a mirror has to be sensed with a complex and highly sensitive interferometer, and then the composite wavefront has to be converted to electrical form, stored in an electronic memory, and manipulated mathematically to determine the magnitude of elemental corrections that have to be made in the deformable mirror.

The adaptive optics approach is inherently slow, because of its reliance on mechanical elements to effect phase compensation. The approach is also subject to errors due to intermirror optical path length differences, called "piston errors." Compensation of these errors has required the use of very complex arrangements of interferometry and adaptive optical components. The approach becomes even less practical as the size of the desired beam aperture increases. For large apertures, in the order of ten meters in diameter, deformable mirrors having as many as 10,000 elements may be required. Since each element is of finite size, the array has limited resolution and ability to correct wavefront distortions. Moreover, the cost and reliability of deformable mirrors of this magnitude have posed serious limitations to the development of a practical system using adaptive optics.

By way of further background, the invention also relates to the field of phase conjugate optics. It has been recognized for some time that phase conjugation of light waves can be used to remove phase aberrations caused by the passage of a light beam through a distorting or phase-aberrating medium.

There is extensive literature on the subject of phase conjugate optics and the use of phase conjugation for the compensation of phase aberrations. A summary of the history and principles of phase conjugate optics is provided in a paper entitled "Phase Conjugate Optics and Real-Time Holography," by Amnon Yariv, IEEE Journal of Quantum Electronics, Vol. QE-14, No. 9, Sept., 1978, pp. 650–60.

Simply stated, a phase conjugation cell functions as a reflector with a special and useful property. When an incident light wave is focused into the cell, the reflected wave that emerges is the complex conjugate of the incident wave. The practical consequence of the phase conjugation is that the retro-reflected wave is as if it were "time-reversed" with respect to the incident wave. For example, if an incident wave, after passing through a distorting medium, has a bulge in its wavefront, representing a phase-lagging condition at a particular region of the front, this will be reflected as an opposite bulge, i.e. a phase lead, in the same region of the reflected wavefront. If the reflected wavefront then traverses the same distorting medium that caused the original bulge in the incident wavefront, the reflected wave will emerge from the distorting medium as an undistorted wave.

In spite of the existence of a large body of theoretical knowledge concerning the principles of phase conjugate optics, prior to the present invention these principles have not been applied to the problem with which the invention is concerned. It will be appreciated from the foregoing that there is still a critical need for an alternative approach to the problem of providing phase-corrected beams in systems employing large optical elements, without building extremely high accuracy into the optical elements themselves. The present invention is directed to this end.

SUMMARY OF THE INVENTION

The present invention resides in apparatus for removing phase aberrations introduced into a light beam by a large optical element. Briefly, and in general terms, the apparatus comprises phase conjugating means, for phase conjugating an incident light beam after it has impinged on the large optical element, and optical means for directing the phase conjugated incident beam back onto the large optical element, to cancel any phase aberrations introduced by the element.

The apparatus as presently preferred also comprises collimating means to collimate the incident light beam transmitted from the large optical element and transmit it into the phase conjugating means. The optical means of the preferred embodiment of the invention includes beam separation means to provide angular separation between the collimated incident light beam and a phase conjugated light beam reflected from the phase conjugation means, and means for expanding the phase conjugated light beam to impinge on the large optical element again.

The incident light beam may be received from a distant object, in which case the optical means and the large optical element cooperated to focus the light beam after it has impinged on the large optical element for the second time, producing an image of the object. Alternatively, the incident beam may be a diffraction-limited laser beam, in which case the optical means and the large optical element cooperate to produce an expanded collimated output beam that is largely free of aberrations that might be introduced by the large optical element.

More specifically, the illustrative embodiment of the invention comprises a large concave mirror for receiving an incident light beam, a collimating optical element in the form of a convex mirror positioned to receive light transmitted from the concave mirror and produce a collimated beam directed through a central aperture in the concave mirror, and phase conjugation means positioned to receive the collimated beam, and operative to produce a phase conjugated beam reflected along substantially the same path as the collimated beam incident on the phase conjugation means. The apparatus further includes beam separation means, positioned in the path of the collimated beam and the reflected phase conjugated beam, to effect an angular separation of these oppositely traveling beams, ensuring that the reflected phase conjugated beam does not impinge on the convex collimating mirror. There is also an additional concave mirror positioned in the path of the reflected phase conjugated beam after it emerges from the beam separator, to expand the phase conjugated beam to impinge on and fill the concave mirror. Phase aberrations introduced into the incident beam by the large concave mirror are cancelled in the phase conjugated beam transmitted from the concave mirror.

In terms of a method for removing phase aberrations introduced into a light beam by a large optical element, the present invention includes the steps of phase conjugating an incident light beam after it has impinged on the large optical element, to produce a phase conjugated beam, directing the phase conjugated beam back onto the large optical element, and, as a result, canceling any phase aberrations introduced by the large optical element. The method further comprises collimating the incident light beam transmitted from the large optical element and transmitting it to the phase conjugating means. Further, the step of directing the phase conjugated beam back onto the large optical element includes angularly separating the phase conjugated beam from the collimated incident light beam, and expanding the phase conjugated light beam to impinge on the large optical element again.

It will be appreciated from the foregoing summary that the present invention represents a significant advance in the field of phase-correction techniques for enhancing high-power light beams or phase-distorted optical images. Other aspects and advantages of the invention will become apparent from transmitted from the large optical element and transmitting it to the phase conjugating means, and the directing step includes angularly separating the phase conjugated beam from the collimated incident light beam, and expanding the phase conjugated light beam to impinge on the large optical element again. the following more detailed description, taken in conjunction with the accompanying drawings.

DESCRIPTION OF THE PREFERRED EMBODIMENT

Figure 1:
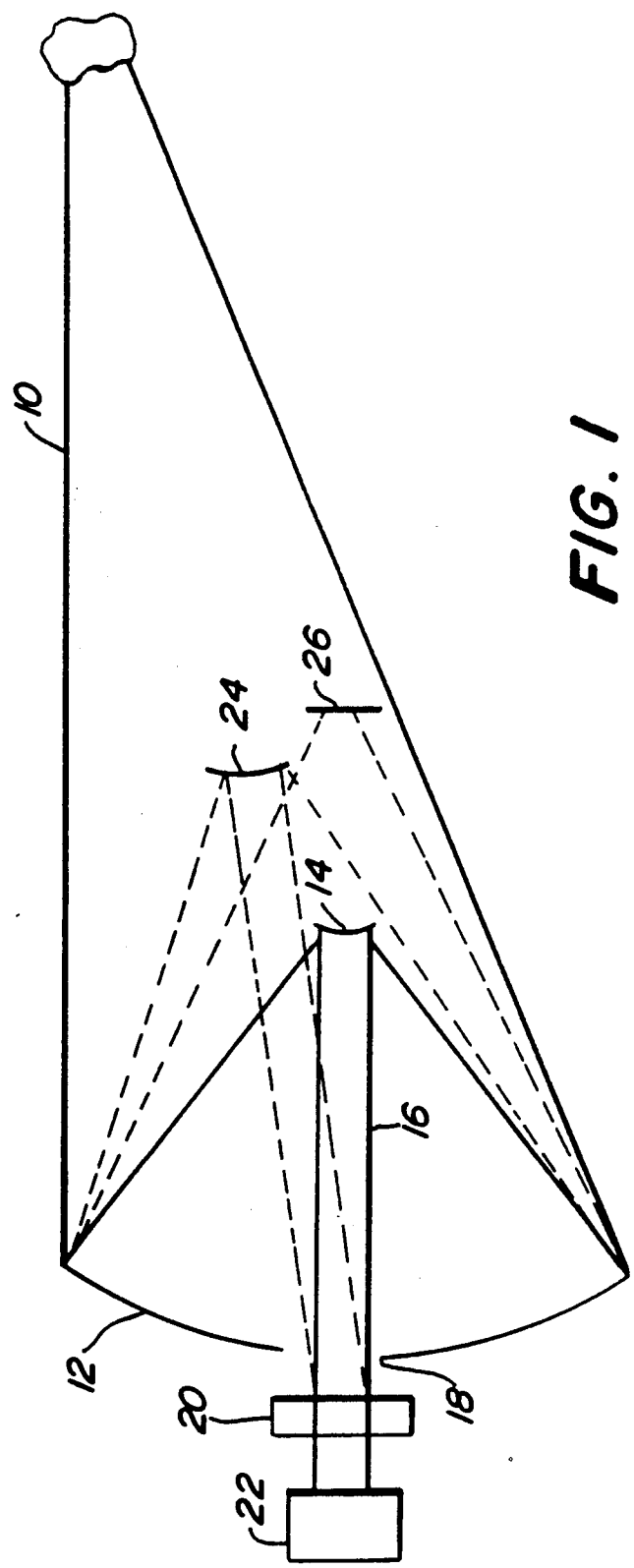
FIG. 1 is a schematic view of one embodiment of the invention, in which an incident light beam from an object to be imaged is subject to phase distortion in a large concave mirror, and is corrected by phase conjugation in accordance with the invention.

As shown in the drawings for purposes of illustration, the present invention is concerned with a novel technique for correcting phase aberrations in systems with large optical elements. Prior approaches have been limited to adaptive optics, or the use of precisely fabricated and expensive optical elements.

In accordance with the invention, a beam that is incident on a large optical element is next focused into phase conjugation means, and then the resultant phase conjugate beam is again processed by the large optical element. Any phase aberrations introduced by the large optical element are removed as a result of a second "pass" through the same element by the phase conjugate of the incident beam.

As shown in FIG. 1, an incident beam, indicated by reference numeral 10, is received from an object to be imaged, and impinges on a large optical element, shown by way of example as a concave mirror 12. The incident beam 10 impinging on the optical element 12 may be broadband radiation from a white light source, or may be from a laser source. The beam 10 is converged by the optical element 12, to impinge on a smaller, convex mirror 14 located generally on the same axis as the mirror 12. The mirror 14 collimates the beam and reflects it, as shown at 16, through a central aperture 18 in the mirror 12, after which the beam passes through a beam separator 20, the purpose of which will shortly be explained, and into a phase conjugator 22. The phase conjugator 22 may be of any suitable type, including, but not limited to, a stimulated Brillouin scattering (SBS) active medium, a four-wave mixer, or a pseudo conjugator. As is known in the art, the phase conjugator generates a phase conjugated reflected beam directed back toward the beam separator 20.

The purpose of the beam separator 20 is to provide an angular difference in the paths of the incident beam applied to the phase conjugator 22 and the phase conjugated reflected beam. The beam separator may include, for example, a quarter-wave plate and a birefringent wedge, neither of which is shown. The quarter-wave plate affects the polarization of the incident beam, and two passes through the plate have the effect of rotating the direction of polarization by ninety degrees. The wedge, which is polarization-sensitive, therefore deflects the reflected beam through a different angle from the deflection angle for the incident beam.

The phase conjugated beam emerging from the beam separator 20 passes to one side of the convex mirror 14 and impinges on a second convex mirror 24, which expands the beam again to fill the large concave mirror 12. Light reflected from the large mirror 12 in this pass is focused onto an image plane or other optical element, as indicated at 26. Since the incident beam is processed by the large optical element twice, once in its original form and once in its phase conjugate form, the resultant beam is free of phase aberrations that would otherwise be introduced by the large optical element 12. The result is a phase-corrected image or a phase-corrected high-power laser beam, and this result is achieved without the need for expensive fabrication of a highly precise optical element.

Figure 2:
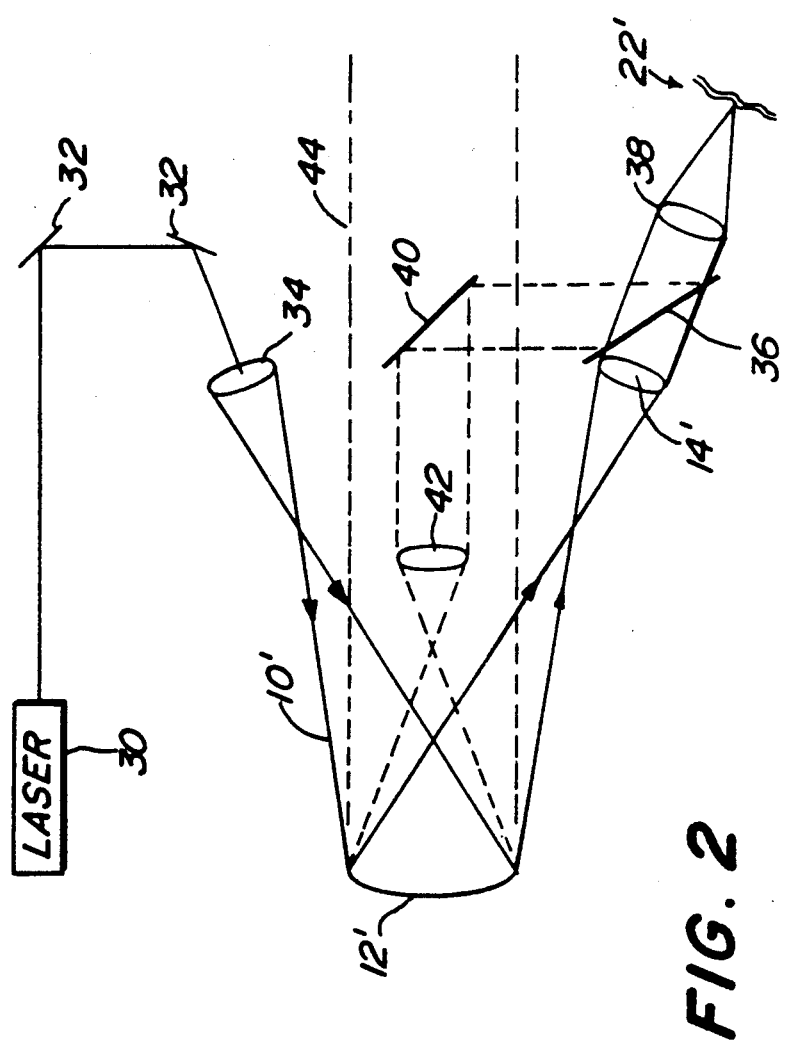
FIG. 2 is a schematic view of an alternative embodiment of the invention, for producing an aberration-free collimated output beam from a diffraction-limited laser source.

In the alternative embodiment of FIG. 2, an incident beam 10' is derived from a laser source 30, which is directed by mirrors 32, as needed, into a lens 34. The lens 34 focuses the laser beam to a point, from which the beam expands to fill a large optical element 12' as a diffraction-limited beam. Light first reflected from the large optical element 12' is collimated by a collimating element 14', which in this case is a lens, transmitted through a partially reflective mirror 36, and then focused by another lens 38 into a phase conjugation device 22'. After phase conjugation, the conjugated beam passes back through lens 38, and is reflected by the mirror 36. The conjugated beam then encounters another mirror 40, which reflects the beam toward the optical element 12'. The conjugated beam is focused by another lens 42, and expanded to fill the optical element 12', from which it is reflected as a largely aberration-free light beam 44. The mirror 36 and the lenses 14' and 38 perform the function of angularly separating the incident and conjugated beams, and it will be apparent that other arrangements may used for this purpose, as indicated at 20 in FIG. 1.

It will be appreciated from the foregoing that the present invention represents a significant advance in the field of phase correction in optical systems using large optical elements, either for imaging distant objects or for processing high-power laser beams. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. Apparatus for removing phase aberrations introduced into a light beam by a large optical element, the apparatus comprising:
    phase conjugating means, for phase conjugating an incident light beam after it has impinged on the large optical element;
    optical means for directing the phase conjugated incident beam back onto the large optical element, to cancel any phase aberrations introduced by the element; and
    collimating means to collimate the incident light beam transmitted from the large optical element and transmit a collimated beam into the phase conjugating means;
    and wherein the optical means includes beam separation means to provide angular separation between the collimated incident light beam and a phase conjugated light beam reflected from the phase conjugation means, and means for expanding the phase conjugated light beam to impinge on the large optical element again.

2. Apparatus as defined in claim 1, wherein:
    the large optical element has a central aperture;
    the collimating means is a convex mirror producing a collimated beam directed through the aperture; and
    the means for expanding the phase conjugated beam includes another convex mirror, positioned to receive the phase conjugated beam and reflect it onto the large optical element.

3. Apparatus as defined in claim 1, wherein:
    the incident light beam emanates from a distant object; and
    the optical means and the large optical element cooperate to focus the light beam after its second impingement on the large optical element, to produce an image of the object.

4. Apparatus as defined in claim 1, wherein:
    the incident light beam is derived from a laser source; and
    the optical means and the large optical element cooperate to produce a collimated output beam that is largely free of phase aberrations.

5. Apparatus for removing phase aberrations introduced into a light beam by a large optical element, the apparatus comprising:
    a large optical element for receiving an incident light beam;
    a collimating optical element positioned to receive light transmitted from the large optical element and produce a collimated beam;
    phase conjugation means positioned to receive the collimated beam, and operative to produce a phase conjugated beam reflected along substantially the same path as the collimated beam incident on the phase conjugation means;
    beam separation means, positioned in the path of the collimated beam and the reflected phase conjugated beam, to effect an angular separation of these two beams, ensuring that the reflected phase conjugated beam does not impinge on the collimating optical element; and
    an additional optical element positioned in the path of the reflected phase conjugated beam after it emerges from the beam separator, for expanding the phase conjugated beam to impinge on and fill the large optical element to practically the same degree as the incident light beam;
    whereby phase aberrations introduced into the incident beam by the large optical element are cancelled in the phase conjugated beam transmitted from the large optical element.

6. Apparatus as defined in claim 5, wherein:
    the large optical element is a concave mirror;
    the collimating optical element is a convex mirror located to receive the incident beam focused by the large optical element;
    the collimated beam passes through an aperture in the large optical element;
    the additional optical element includes another convex mirror, producing a diverging beam that fills substantially the same area of the large optical element as the original incident beam, whereby light is then reflected from the large optical element as a phase-corrected beam or image.

7. Apparatus as defined in claim 5, wherein:
    the incident light beam emanates from a distant object; and
    the additional optical element and the large optical element cooperate to focus the light beam after its second impingement on the large optical element, to produce an image of the object.

8. Apparatus as defined in claim 5, wherein:
    the incident light beam is derived from a laser source; and
    the additional optical element and the large optical element cooperate to produce a collimated output beam that is largely free of phase aberrations.

9. Apparatus for removing phase aberrations introduced into a light beam by a large optical element, the apparatus comprising:
    a large concave mirror for receiving an incident light beam, the mirror having a central aperture;
    a collimating optical element in the form of a convex mirror positioned to receive light transmitted from the concave mirror and produce a collimated beam directed through the central aperture in the concave mirror;
    phase conjugation means positioned to receive the collimated beam, and operative to produce a phase conjugated beam reflected along substantially the same path as the collimated beam incident on the phase conjugation means;

beam separation means, positioned in the path of the collimated beam and the reflected phase conjugated beam, to effect an angular separation of these two beams, ensuring that the reflected phase conjugated beam does not impinge on the convex collimating mirror; and an additional convex mirror positioned in the path of the reflected phase conjugated beam after it emerges from the beam separator, for expanding the phase conjugated beam to impinge on and fill the convex mirror;

whereby phase aberrations introduced into the incident beam by the large concave mirror are cancelled in the phase conjugated beam transmitted from the concave mirror.

10. A method for removing phase aberrations introduced into a light beam by a large optical element, the method comprising the steps of:

phase conjugating an incident light beam after it has impinged on the large optical element, to produce a phase conjugated beam;

directing the phase conjugated beam back onto the large optical element; and, as a result, canceling any phase aberrations introduced by the large optical element;

wherein the method further comprises collimating the incident light beam transmitted from the large optical element and transmitting it to the phase conjugating means;

and wherein the directing step includes angularly separating the phase conjugated beam from the collimated incident light beam, and expanding the phase conjugated light beam to impinge on the large optical element again.

11. A method as defined in claim 10, and further including the steps of:

receiving the incident light beam from a distant object; and after expanding the phase conjugated light beam, focusing the expanded light beam to produce and image of the object.

12. A method as defined in claim 10, and further including the steps of:

generating a diffraction limited laser beam for use as the incident light beam; and after expanding the phase conjugated light beam, collimating the expanded beam to produce an output collimated beam largely free of aberrations.

* * * * *